United States Patent [19]

Schaulin

[11] Patent Number: 4,992,532
[45] Date of Patent: Feb. 12, 1991

[54] WATER-SOLUBLE PHTHALOCYANINE COMPOUNDS, PREPARATION AND USE THEREOF

[75] Inventor: Rudolf Schaulin, Wohnsitz, Switzerland

[73] Assignee: Ciba-Geigy Corporation, Ardsley, N.Y.

[21] Appl. No.: 346,688

[22] Filed: May 3, 1989

[30] Foreign Application Priority Data

Nov. 5, 1988 [CH] Switzerland ............. 1786/88

[51] Int. Cl.$^5$ ............................................. C09B 47/04
[52] U.S. Cl. ................................... 534/702; 534/845; 534/766; 540/140; 540/122; 540/123; 540/124
[58] Field of Search ............ 534/702, 845, 766; 540/140, 122, 123, 124

[56] References Cited

U.S. PATENT DOCUMENTS 3,622,557 11/1971 Seller et al. ........................... 45/48
3,625,936 12/1971 Meininger et al. ................. 534/845
4,201,547 5/1980 Feess et al. ............................ 8/543
4,602,084 7/1986 Hurter ................................. 534/641

FOREIGN PATENT DOCUMENTS 1176300 8/1964 Fed. Rep. of Germany .
61-87759 5/1986 Japan .
 763343 12/1956 United Kingdom .
1022751 3/1966 United Kingdom .

OTHER PUBLICATIONS

Chem. Abstract 62 2860a.
Chem. Abstract, 105 192866t(1986).
Rad et al., Chemical Abstracts, vol. 82, 1975, No. 8, #45056g (Indian Pat. No. 101,829).

Primary Examiner—Mukund J. Shah
Assistant Examiner—Matthew V. Grumbling
Attorney, Agent, or Firm—Edward McC. Roberts

[57] ABSTRACT

The compounds of the formula

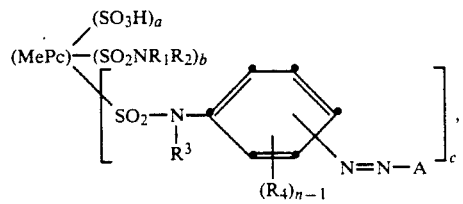

where the substituents and indices are as defined in claim 1, are green direct dyes for various substrates, in particular cellulosic fibre materials. They are high-temperature stable and therefore are particularly highly suitable for the one-bath, single-stage dyeing of polyester/cotton blend fabrics together with a disperse dye for the polyester fibres under the dyeing conditions for polyester fibres.

11 Claims, No Drawings

WATER-SOLUBLE PHTHALOCYANINE COMPOUNDS, PREPARATION AND USE THEREOF

The present invention relates to novel water-soluble phthalocyanine compounds, to processes for the preparation thereof, and to the use thereof for dyeing and printing fibre materials, in particular textile fibre materials.

The present invention accordingly provides novel water-soluble phthalocyanine compounds of the formula

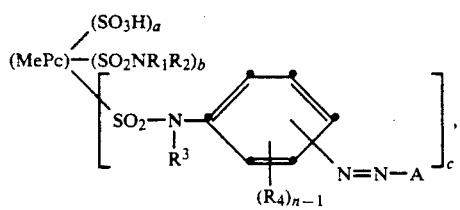

where $R_1$ and $R_2$ are identical to or different from one another and each hydrogen, hydroxyalkyl of 2 or 3 carbon atoms, carboxyalkyl of 1 to 3 carbon atoms in the alkyl moiety or phenyl, or $R_1$ and $R_2$, together with the nitrogen atom, form a heterocyclic ring with or without further hetero atoms, $R_3$ is hydrogen or methyl, $R_4$ is hydrogen, alkyl or alkoxy $COR_6$, where $R_6$ is alkyl or hydroxyalkyl each of 1 to 5 carbon atoms, —NH each of 1 to 3 carbon atoms or substituted or unsubstituted phenyl, or sulfo, Me is a coordinatively bonded metal atom, Pc is an $(a+b+c)$-valent phthalocyanine radical, n is from 1 to 3, A is a monosubstituted phenyl radical, a naphthyl radical or a heterocyclic radical, a is from 1 to 1.5, b is from 0.5 to 1.5, c is from 1 to 2 and the sum of $(a+b+c)$ is from 2.5 to 4.

The substituents $R_1$ and $R_2$, which are identical to or different from one another, have the meaning of hydrogen, hydroxyalkyl of 2 to 5 carbon atoms, e.g. hydroxyethyl, hydroxy-n-propyl, hydroxy-n-butyl or hydroxy-n-pentyl, and the corresponding branched hydroxyalkyl radicals, carboxyalkyl of 1 to 5 carbon atoms in the alkyl moiety, e.g. carboxymethyl, carboxyethyl, carboxy-n-propyl, carboxy-n-butyl or carboxy-n-pentyl, and the corresponding carboxyalkyl radicals whose alkyl moiety is branched, or phenyl.

Preferred substituents $R_1$ and $R_2$ are hydrogen, hydroxyethyl, carboxyalkyl of 1 or 2 carbon atoms in the alkyl radical (—$CH_2COOH$ and —$CH_2CH_2COOH$) and phenyl, a particularly preferred combination being where one of the substituents $R_1$ and $R_2$ is hydrogen while the other has one of the other stated meanings.

A heterocyclic ring formed by $R_1$ and $R_2$ together with the nitrogen atom to which they are bonded is preferably a saturated heterocyclic 5- or 6-ring which may contain nitrogen, sulfur and/or oxygen atoms as further hetero atoms. Examples of heterocyclic radicals —$NR_1R_2$ are thus pyrrolidino, piperidino, pipecolino, morpholino, thiomorpholino and piperazino, of which pyrrolidino, piperidino, morpholino and thiomorpholino are preferred.

$R_3$ is methyl or preferably hydrogen.

A $C_1-C_5$alkyl $R_4$ in the compounds of the formula (1) is for example: methyl, ethyl, propyl, isopropyl, n-butyl, isobutyl, sec-butyl, tertbutyl, pentyl or isopentyl. Preference is given to the alkyl radicals mentioned that have 1 to 3 carbon atoms, in particular methyl.

A $C_1-C_5$alkoxy $R_4$ is for example: methoxy, ethoxy, propoxy, isopropoxy, n-butoxy, isobutoxy, sec-butoxy, tert-butoxy, pentoxy or isopentoxy. Preference is given to the alkoxy radicals mentioned that have 1 to 3 carbon atoms, in particular methoxy.

—$NHCOR_6$ $R_4$ in the compounds of the formula (1) is for example —$NHCOCH_3$, —$NHCOCH_2CH_3$, —$NHCOCH_2CH_2CH_3$, —$NHCOCH_2OH$, —$NHCOCH_2CH_2OH$, —$NHCOCH_2CH_2CH_2OH$ or

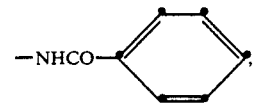

where the phenyl ring may be substituted, for example by methyl or halogen. Preferred substituents —$NHCOR_6$ are —$NHCOCH_3$, —$NHCOCH_2OH$ and —$NHCOC_6H_5$.

A sulfo $R_4$ comprises not only the free acid form (—$SO_3H$) but also the salt form, possibilities being in particular alkali metal salts (Li, Na, K) or ammonium salts.

The radical A, which in some variants is the coupling component, is in the meaning of a monosubstituted phenyl radical a phenyl radical substituted by alkyl or alkoxy each of 1 to 5, preferably 1 to 3, carbon atoms, possible single substituents being those as mentioned for Rfurther substituents can be hydroxyl, carboxyl or sulfo.

A naphthalene radical A can contain one or more, for example 1 to 4, preferably 1 or 2, of the substituents mentioned for phenyl A.

A heterocyclic radical A can be for example a pyrazol-5-one or hydroxypyridonyl radical.

A hydroxypyridonyl radical A has for example a structure of the formula

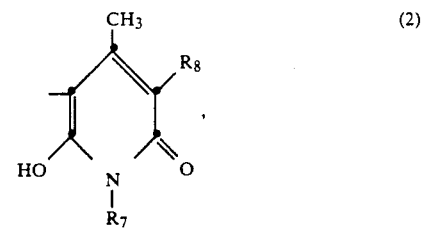

where $R_7$ is alkyl of 1 to 4 carbon atoms, e.g. methyl, ethyl, n-propyl, n-butyl and corresponding isomers, and $R_8$ is —CN, —$CONH_2$ or —$CH_2SO_3H$.

A pyrazol-5-one radical A conforms for example to the formula

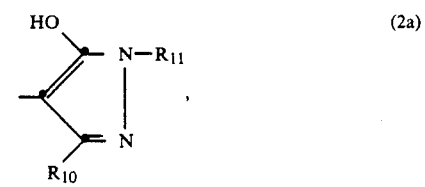

where $R_{10}$ is —$NH_2$, —COOH, ethyl or in particular methyl and $R_{11}$ is unsubstituted or sulfo-substituted 1- or 2-naphthyl or preferably unsubstituted or $C_1-C_3$alkyl-, $C_1$–$C_3$ alkoxy-, chlorine-, sulfo-, methyl- sulfonyl-, acetylamino-, hydroxyl- and/or carboxyl-substituted phenyl.

A coordinatively bonded metal atom Me in the compounds of the formula (1) is for example an iron, cobalt, nickel or in particular a copper atom.

$COC_6H_5$ or sulfo, $R_5$ is alkyl or alkoxy of 1 to 3 carbon atoms, such as indicated for example for $R_4$, hydroxyl, carboxyl or sulfo, and Pc, $R_3$, a, b, c and n are as defined above.

Further preferred compounds of the formula (1) conforms to the formulae

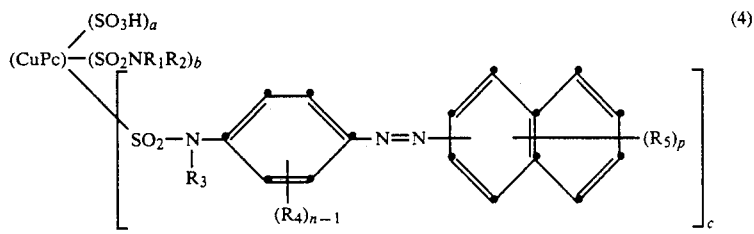

and

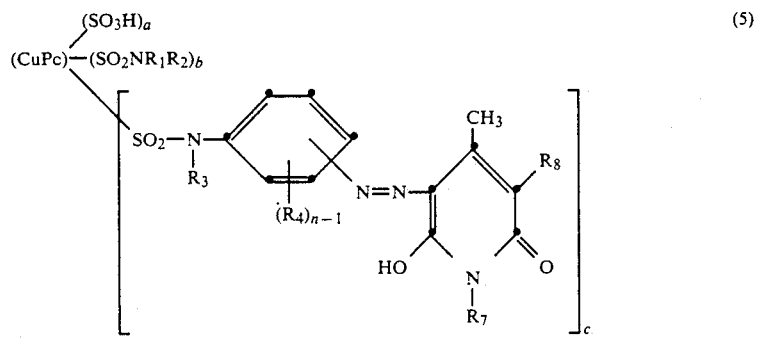

Pc is short for an (a+b+c)valent phthalocyanine radical.

The index a preferably has an (average) value of 1 to 1.2 and particularly preferably the value 1; the index b preferably has an (average) value of 0.5 to 1, and the index c preferably has an (average) value of 1 to 1.2.

Preference is given to those compounds of the formula (1) where $R_1$ and $R_2$ are identical to or different from one another and are each hydrogen, hydroxyethyl or carboxyalkyl of 1 or 2 carbon atoms in the alkyl radical or phenyl, or $R_1$ and $R_2$, together with the nitrogen atom, form a heterocyclic 5- or 6-membered ring which may contain nitrogen, sulfur and/or oxygen atoms as further hetero atoms, $R_4$ is alkyl or alkoxy each of 1 to 3 carbon atoms, —$NHCOCH_3$, —$NHCOCH_2OH$, —$NHCOC_6H_5$ or sulfo, Me is a coordinatively bonded iron, cobalt, nickel or in particular copper atom, and Pc, $R_3$, a, b, c and n are as defined above.

Particularly preferred compounds of the formula (1) conform to the formula

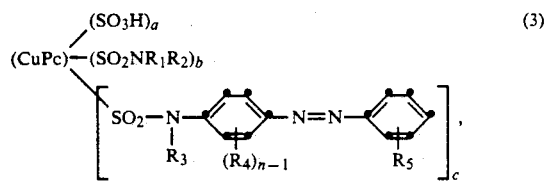

where $R_1$ and $R_2$ are identical or different from one another and are each hydrogen, hydroxyethyl or carboxyalkyl of 1 or 2 carbon atoms in the alkyl radical or phenyl, or $R_1$ and $R_2$, together with the nitrogen atom, form a heterocyclic 5- or 6-membered ring which may contain nitrogen, sulfur and/or oxygen atoms as further hetero atoms, $R_4$ is alkyl or alkoxy each of 1 to 3 carbon atoms, —$NHCOCH_3$, —$NHCOCH_2OH$, —NHwhere p is a number from 1 to 4, $R_7$ is alkyl of 1 to 4 carbon atoms, $R_8$ is —CN, —$COHN_2$ or —$CH_2SO_3H$ and $R_1$, $R_2$, $R_3$, $R_4$, $R_5$, a, b, c and n are as defined above.

The present invention further provides a process for preparing the compounds of the formula (I), which comprises reacting (condensing) metal phthalocyaninesulfonyl chlorides of the formula

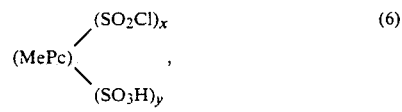

where Me is a coordinatively bonded metal atom, x is from 2.5 to 4, y is from 0 to 1.5 and the sum of (x+y) is from 2.5 to 4, preferably from 2.5 to 3, with compounds having primary or secondary amino groups and the formulae

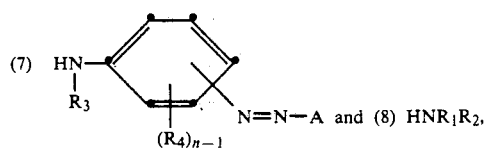

where $R_1$, $R_2$, $R_3$, $R_4$, A, Me, Pc and n are as defined under the formula (1), in an aqueous medium at temperatures of 0° to 100° C. by maintaining a pH of 5 to 10 and then performing an optional acid or alkaline hydrolysis.

The process according to the invention is preferably carried out at 0° to 40° C. and a pH within the range from 5 to 8. Suitable condensation aids are nitrogen-containing compounds, for example pyridine, nicotinic acid or imidazola.

The compounds of the formulae (7) and (8) can be reacted at the same time or in succession with the phthalocyaninesulfonyl chlorides of the formula (6), although in general the sequence is first the amino-containing azo dyes of the formula (7) and then the amines of the formula (8). They are used in (b)- and (c)-molar, respectively, amounts based on the compound of the formula (6), but preferably in from 0.1 to 1 times molar excess.

The alkaline hydrolysis can be carried out with alkali metal hydroxides, carbonates or bicarbonates or ammonia or amines, and the acid hydrolysis with mineral acids, in particular hydrochloric acid or sulfuric acid.

An alternative method for preparing the compounds of the formula (1) comprises reacting the phthalocyaninesulfonyl chlorides of the formula

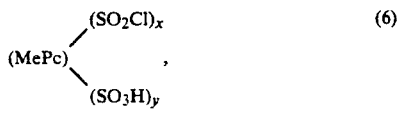

where x is from 2.5 to 4, y is from 0 to 1.5 and the sum of x+y is from 2.5 to 4, preferably from 2.5 to 3, simultaneously or in succession with amines of the formulae

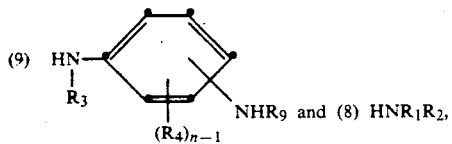

where $R_9$ is a protective group, for example acetyl, and $R_1$, $R_2$, $R_3$, $R_4$, Ms, Pc and n are as defined above, in an aqueous medium at temperatures of 0° to 100° C. by maintaining a pH of 5 to 10, then eliminating this protective group, diazotizing the resulting amino group, and subsequently coupling the diazo compound onto a coupling component A.

The starting phthalocyaninesulfonyl chlorides of the formula (6) are known to the person skilled in the art or can be prepared in a manner known per se (reaction of the metal phthalocyanine with chlorosulfonic acid and/or thionyl chloride ride at elevated temperature) (see for example K. Venkataraman. The Chemistry of Synthetic Dyes, vol. V. p. 261 (1971). Academic Press, New York/London: F. M. Moser, A. L. Thomas, The phthalocyanines, vol. II, p. 20–22, CRC Press; 1983).

The compounds of the formula (7) are likewise known, generally yellow, azo dyes having a free primary or secondary amino group. The amino compounds of the formulae (8) and (9) are commonly known and readily accessible.

The present invention further provides for the use of the phthalocyanine compounds of the formula (1), alone or mixed with one another, for dyeing or printing nitrogen-containing and in particular hydroxyl-containing fibre materials.

The phthalocyanine compounds (phthalocyanine azo dyes) of the formula (1) according to the invention are thus suitable for dyeing and printing nitrogen-containing or in particular cellulosic fibre materials, preferably textile fibre materials, made of silk, wool or synthetic polyamides, and preferably of cellulosic fibres, such as rayon, cotton or hemp.

In respect of their dyeing properties, they can be classed as direct dyes (C.I. Direct Dyes).

Similarly, it is possible to dye textile fibre materials composed of blend fibres, for example wool/cotton, polyamide/cotton, acrylic/cotton or in particular polyester/cotton blend fibres, by one-bath dyeing methods and in the presence of dyes for the respectively other fibre types.

The textile fibre materials can be present in a very wide range of processing states, for example as fibre, yarn, woven fabric or knitted fabric.

As well as textile substrates, it is also possible to dye leather and paper with compounds (dyes) of the formula (1) according to the invention.

The results obtained are level dyeings in brilliant green shades having good all-round fastness properties, in particular good rub, wet, wet rub, perspiration and light fastness properties. If necessary, it is possible to significantly improve the wet fastness properties, in particular the wash fastness, of the direct dyeings and prints obtained by an aftertreatment with fixing agents.

The dyes of the formula (1) according to the invention are highly compatible with other dyes, in particular disperse dyes. The dyes according to the invention show adequate high temperature stability and thus are dyeable from aqueous liquors under the dyeing conditions for polyester fibres, i.e. at temperatures within the range from about 100° to 150° C., preferably from 110° to 130° C., at a pH of 4 to 7.5, preferably 5 to 7.

It is consequently possible to use customary disperse dyes together with the dyes of the formula (1) according to the invention in a single-stage, one-bath process for dyeing polyester/cotton blend fibres (blend fabrics) and obtain level and fast dyeings on the two fibres with the respective dyes. If a disperse dye having the same shade as the dye according to the invention is used, it is even possible to dye in matching shades.

The provision of the dyes of the formula (1) according to the invention significantly simplifies the dyeing of textile blend fibres (blend fabrics), for example blends of polyester and cellulose fibres. The customary dyeing of each fibre portion of the fibre blend in a separate operation under different dyeing conditions is consequently no longer necessary.

The compounds of the formula (1) according to the invention are also suitable for manufacturing aqueous inks for ink jet printing.

The Examples serve to illustrate the invention. Parts and percentages are by weight, unless otherwise stated. Parts by weight bear the same relation to parts by volume as the kilogram to the liter. The temperatures are given in degrees Celsius.

EXAMPLE 1

14.6 parts of copper phthalocyaninesulfonyl chloride (having on average 2.5 chlorosulfonyl groups per molecule) are suspended in 500 parts of water. To this suspension are added 12 parts of the compound of the formula

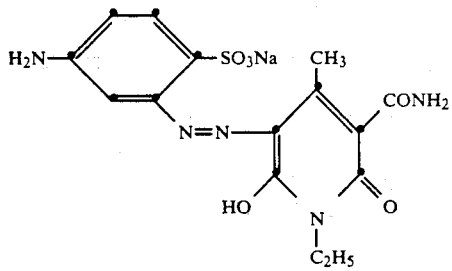
(101)

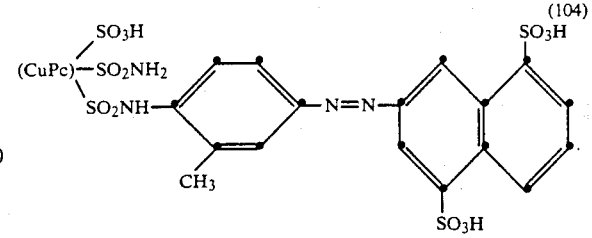
(104)

and 1 part of pyridine. The reaction mixture is stirred at a constant pH of 5.5 (maintained with 1N ammonium hydroxide solution) at 20° to 25° C. for 4 hours, then at 30° to 35° C. for 2 hours and finally 40° to 45° C. for a further 2 hours. The suspension is then brought to pH 8 with 1N ammonium hydroxide solution and stirred at 40° to 45° C. for a further hour. This requires about 70 parts of 1N ammonium hydroxide solution.

The resulting dye is then precipitated with 60 parts of sodium chloride, filtered off and washed with 10% aqueous sodium chloride solution. The filter residue is slurried with hot ethanol, filtered off again and washed with hot ethanol until the filtrate is colourless.

Drying leaves 30 parts of the dye of the formula

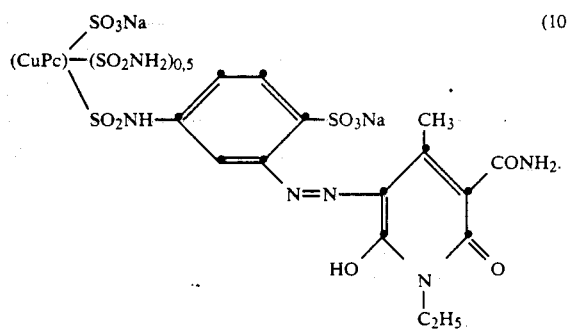
(102)

The dye dyes paper, cellulosic textile fibre materials, in particular those made of cotton, and leather in brilliant green shades.

The same method can also be used to prepare the dyes of the formulae

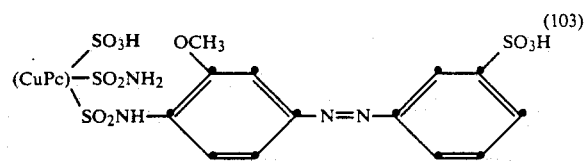
(103)

and

EXAMPLE 2

14.6 parts of copper phthalocyaninesulfonyl chloride (having on average 2.5 chlorosulfonyl groups per molecule) are suspended in 500 parts of water. To this suspension are added 12 parts of the compound of the formula.

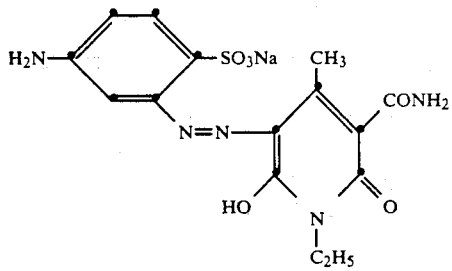

and 1 part of pyridine. The reaction mixture is stirred at a constant pH of 7–7.5 (maintained with 1N ammonium hydroxide solution) at 0° to 5° C. for 4 hours, then at 20° to 25° C. for 2 hours and finally at 35° to 40° C. for a further 2 hours. The suspension is then brought to pH 8 with 1N ammonium hydroxide solution and stirred at 40° to 45° C. for a further hour. This requires about 70 parts of 1N ammonium hydroxide solution.

The resulting dye is then precipitated with 60 parts of sodium chloride, filtered off and washed with 10% aqueous sodium chloride solution. The filter residue is slurried with hot ethanol, filtered again and washed with hot ethanol until the filtrate is colourless.

Drying leaves 30 parts of the salt-containing dye of the formula

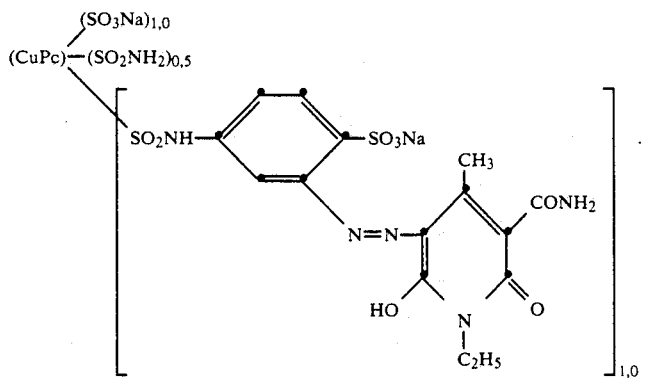

The dye dyes paper, cellulosic textile fibre materials, in particular those made of cotton, and leather in brilliant green shades.

EXAMPLE 3

43.6 parts of a copper phthalocyaninesulfonyl chloride containing on average about 1.7 chlorosulfonyl and about 1.0 sulfo groups per molecule are suspended in 400 parts of ice-water. To this suspension are added a solution of 21 parts of the monoazo dye 3-sulfo-2'-acetamido-4'-aminoazobenzene (sodium salt) in 350 parts of ice-water and 1.0 part of pyridine. The reaction mixture is stirred at a constant pH of 7.5–8.0 (maintained with 1N ammonium hydroxide solution) at 0° to 5° C. for 4 hours, then at 20° to 25° C. for 2 hours and finally at 35° to 40° C. for a further 2 hours. The suspension is then brought to pH 8 with 1N ammonium hydroxide solution and stirred at 40° to 45° C. for a further hour. This requires about 70 parts of 1N ammonium hydroxide solution.

The resulting dye is then precipitated with sodium chloride, filtered off and washed with aqueous sodium chloride solution. The filter residue is slurried with hot ethanol, filtered off again and washed with hot ethanol until the filtrate is colourless.

Drying leaves 59 parts of the salt-containing dye of the formula

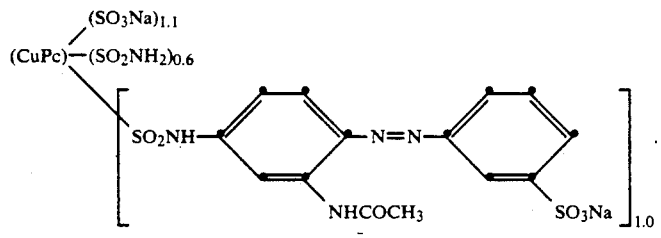

EXAMPLE 4

23.1 parts of copper phthalocyanine base (sodium salt) containing per molecule about 1.1 sulfo groups, about 0.7 —SO$_2$NH groups and about 1.1 groups of the formula

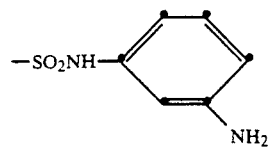

(prepared in a manner known per se by sulfochlorination of copper phthalocyanine and subsequent reaction with ammonia and 3-aminoacetanilide, followed by elimination of the protective acetyl group) are added to a solution of 2 parts of sodium nitrite in 200 parts of water. After 100 parts of ice have been added, a solution of 14 parts of 30% hydrochloric acid in 50 parts of ice-water is added dropwise with stirring at 0° to 2° C. The suspension of the diazonium salt is then added dropwise at 0° to 4° C. to a solution of 6.6 parts of 6-hydroxy-3-carbamoyl-4-methyl-1-ethylpyrid-2-one in 200 parts of ice-water. During the coupling the pH of the reaction mixture is maintained at 9 to 9.5 by addition of 30% sodium hydroxide solution. After the reaction has ended the reaction solution is admixed with sodium chloride, and the precipitated dye is filtered off, washed with sodium chloride solution and dried, giving the dye of the formula

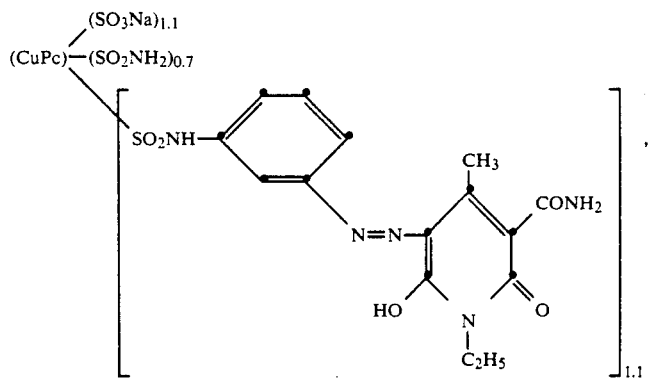

which dyes cellulose materials and leather in brilliant green shades of good light fastness.

EXAMPLES 5 to 10

The methods described in Examples 1 to 3 were used to prepare the following dyes which each dye cellulose materials and leather in brilliant green shades having good all-round fastness properties:

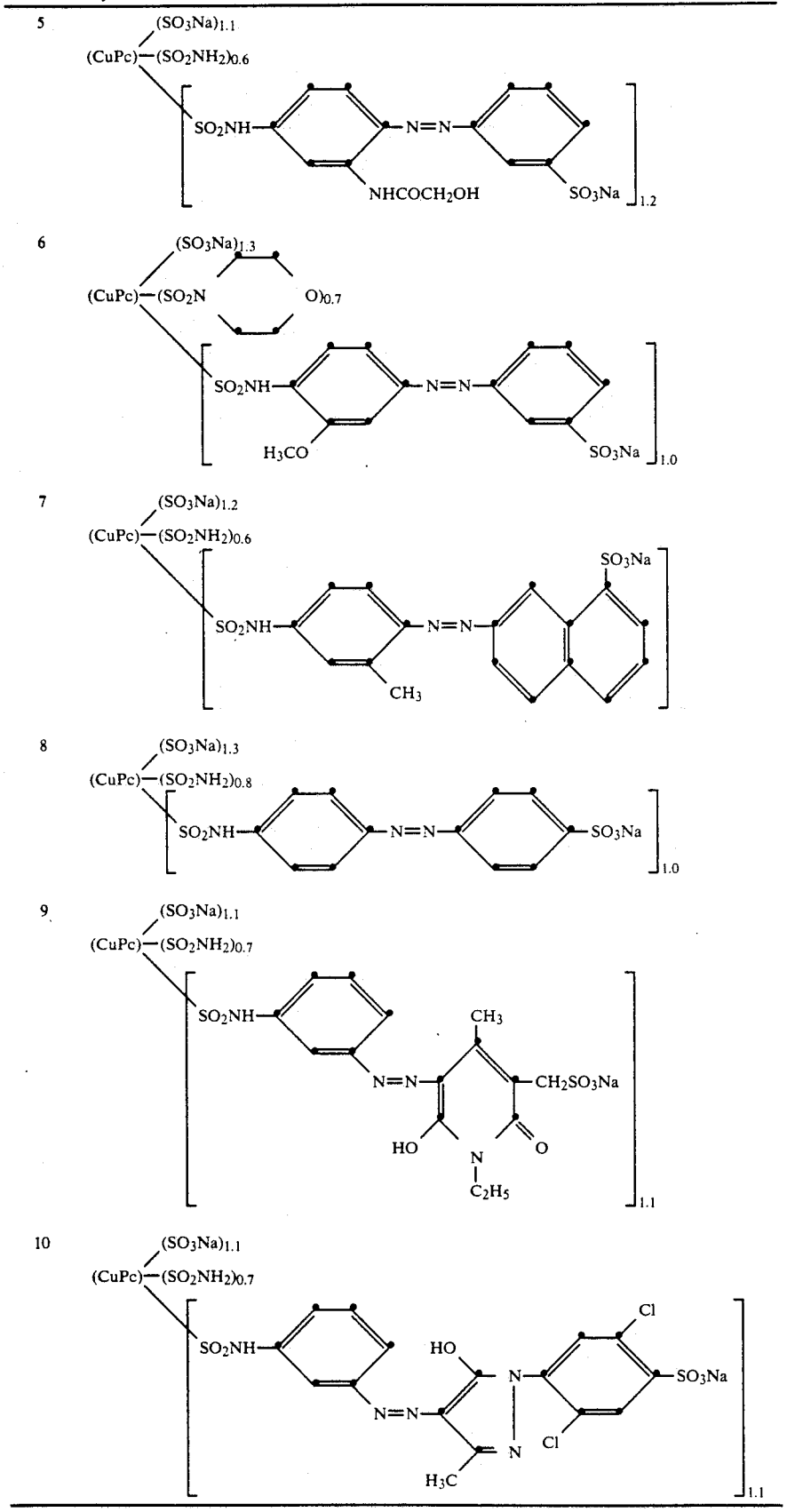

Dyeing method 1

10 parts of cotton fabric (bleached and mercerized) are introduced at about 30° C. into a dyebath containing 200 parts of water and 0.35 part of dye of Example 2. The liquor is heated to 95° C. in the course of 30 minutes and left at that temperature for 15 minutes. 4 parts of sodium sulfate are then added, and dyeing is continued at 95° C. for a further 45 minutes. The dyebath is then cooled down to 80° C. in the course of 15 minutes and left at that temperature for a further 15 minutes. The dyeing is then thoroughly rinsed with cold water and dried.

Dyeing method 2

10 parts of a polyester/cotton fibre blend are introduced at about 50° C. into a dyebath containing 200 parts of water, a mixture of 0.05 part of C.I. Disperse Yellow 99, 0.5 part of C.I. Disperse Blue 60 and 0.2 part of the dye of Example 3, 0.4 part of ammonium sulfate and 0.2 part of an anionic dispersant (for example a formaldehyde condensation product of naphthalenesulfonic acid). The dyebath is brought to pH 5.5 with formic acid, 1 part of sodium sulfate is added, and the temperature is raised to about 130° C. in the course of 45 minutes. Dyeing is continued at 130° C. for a further 45 minutes, and the dyebath is then cooled down to about 80° C. in the course of 30 minutes and left at that temperature for a further 45 minutes. The dyeing is then thoroughly rinsed with cold water and dried.

Dyeing method 3

Dyeing methods 1 and 2 are followed, except that at the end of the dyeing process and following the cold rinse the dyeing is introduced into a fresh hot bath at about 30° C. containing 200 parts of water and 0.2–0.6 part of a cationic aftertreating agent (amine-formaldehyde-dicyandiamide condensation product or preparation based on dicyandiamide and diethylenetriamine). The dyeing is aftertreated at 30° C. for 30 minutes and then dried without further rinsing; a dyeing having improved wet fastness properties is obtained.

Dyeing method 4

Dyeing methods 1 and 2 are followed, except that at the end of the dyeing process and following the cold rinse the dyeing is introduced into a fresh hot bath at about 25° C. containing 200 parts of water, 1 part of sodium sulfate and 0.6 part of a fibre-reactive cationic aftertreating agent based on N-methyldialkylamine and epichlorohydrin. The temperature is raised to 40° C. in the course of 15 minutes, 0.8 part of 30% sodium hydroxide solution is added, and the dyeing is treated at 40° C. for a further 45 minutes. The dyeing is finally rinsed hot and dried; it has improved wet fastness properties.

What is claimed is:

1. A compound of the formula

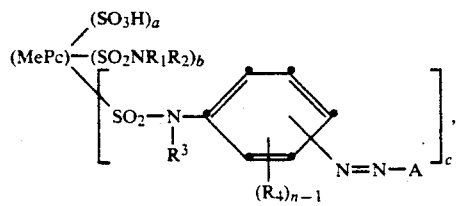
(1)

where $R_1$ and $R_2$ are identical to or different from one another and are each hydrogen, hydroxyalkyl of 2 or 3 carbon atoms, carboxyalkyl of 1 to 3 carbon atoms in the alkyl moiety or phenyl; or $R_1$ and $R_2$, together with the nitrogen atoms, form a heterocyclic ring with or without further hetero atoms; $R_3$ is hydrogen or methyl; $R_4$ is hydrogen, alkyl or alkoxy each of 1 to 5 carbon atoms, —NHCOR$_6$, where $R_6$ is alkyl or hydroxyalkyl each of 1 to 3 carbon atoms or substituted or unsubstituted phenyl, or sulfo; Me is a coordinatively bonded metal atom; Pc is an (a+b+c) valent phthalocyanine radical; n is from 1 to 3; A is a monosubstituted phenyl radical, a naphthyl radical or a heterocyclic radical, A is phenyl which is monosubstituted by $C_1$–$C_5$alkyl, $C_1$–$C_5$alkoxy, hydroxyl, carboxyl or sulfo; naphthyl which is unsubstituted or substituted by $C_1$–$C_5$alkyl, $C_1$–$C_5$alkoxy, hydroxyl, carboxyl or sulfo; a hydroxypyridonyl radical of the formula

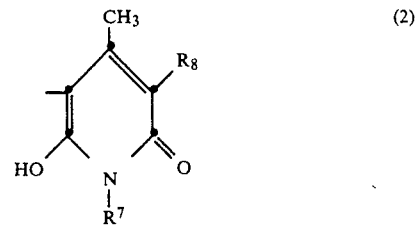
(2)

wherein $R_7$ is $C_1$–$C_4$alkyl and $R_8$ is —CN, —CONH$_2$ or —CH$_2$SO$_3$H; or a pyrazol-5-one radical of the formula

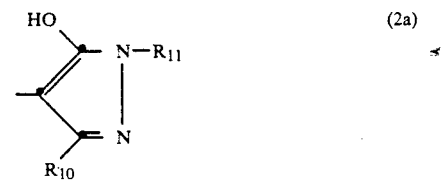
(2a)

wherein $R_{10}$ is —COOH, methyl or ethyl and $R_{11}$ is unsubstituted or sulfo substituted 1- or 2-naphthyl or unsubstituted of $C_1$–$C_3$alkyl-, $C_1$–$C_3$alkoxy-, chlorine-, sulfo-, methylsufonyl-, hydroxyl- or carboxyl-substituted phenyl; a is from 1 to 1.5; b is from 0.5 to 1.5; c is from 1 to 2 and the sum of (a+b+c) is from 2.5 to 4. (a+b+c) is from 2.5

2. A compound according to claim 1, wherein $R_1$ and $R_2$ are identical to or different from one another and are each hydrogen, hydroxyethyl or carboxyalkyl of 1 or 2 carbon atoms in the alkyl radical or phenyl, or $R_1$ and $R_2$, together with the nitrogen atom, form a heterocyclic 5- or 6-membered ring which may contain nitrogen, sulfur and/or oxygen atoms as further hetero atoms, $R_4$ is alkyl or alkoxy each of 1 to 3 carbon atoms, —NHCOCH$_3$, —NHCOCH$_2$OH, —NHCOC$_6$H$_5$ or sulfo, Me is a coordinatively bonded iron, cobalt, nickel or copper atom.

3. A compound according to claim 1, wherein a and c are each independently of the other from 1 to 1.2 and b is from 0.5 to 1.

4. A compound according to claim 1, which conforms to the formula

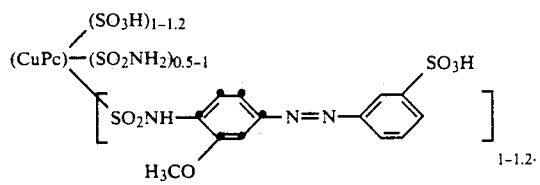

5. A compound according to claim 1, which conforms to the formula

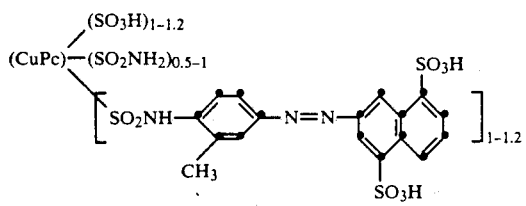

6. The process according to claim 1, wherein a blend of a synthetic fibre and a cellulosic fibre material in particular a polyester/cotton blend fabric, is dyed in the presence of a disperse dye for the polyester fibres under the dyeing conditions for polyester fibres.

7. A process for dyeing a polyester/cotton blend fabric with a disperse dye and a direct dye, which comprises using in a single-stage, one-bath process apart from the disperse dye a dye of the formula (1) according to claim 1 and dyeing from an aqueous liquor at temperatures within the range from 100° to 150° C., preferably 120° to 130° C., and at a pH between 4 and 7.5.

8. A compound according to claim 1, of the formula

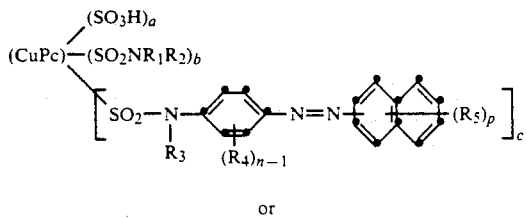

or

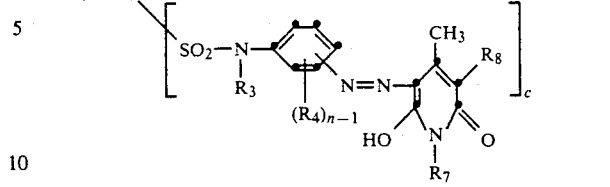

where p is from 1 to 4; $R_5$ is $C_1$-$C_5$alkyl, $C_1$-$C_5$alkoxy, hydroxyl, carboxyl or sulfo.

9. A compound according to claim 1, of the formula

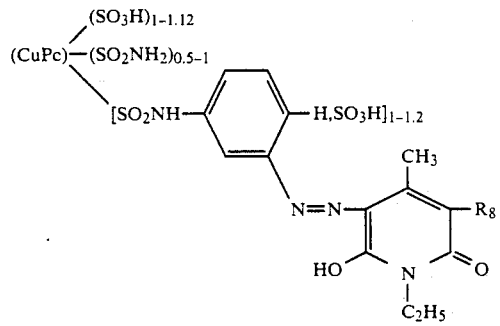

wherein $R_8$ is $CONH_2$ or $CH_2SO_3H$.

10. A compound of claim 1, wherein Me is Cu, $R_1$ and $R_2$ are identical to or different from one another and are each hydrogen, hydroxyethyl or carboxyalkyl of 1 to 2 carbon atoms in the alkyl radical or phenyl, or $R_1$ and $R_2$, together with the nitrogen atom, form a heterocyclic 5- or 6-membered ring which may contain nitrogen, sulfur and/or oxygen atoms as further hetero atoms, $R_4$ is alkyl or alkoxy each of 1 to 3 carbon atoms, —NHCOCH$_3$, —NHCOCH$_2$OH, —NHCOC$_6$H$_5$ or sulfo, and A is phenyl which is monosubstituted by alkyl or alkoxy of 1 to 3 carbon atoms, hydroxyl, carboxyl or sulfo.

11. A process for dyeing and printing nitrogen-containing and in particular cellulosic fibre materials which comprises the use of a dye according to claim 1.

* * * * *

UNITED STATES PATENT AND TRADEMARK OFFICE
CERTIFICATE OF CORRECTION

PATENT NO. : 4,992,532
DATED : February 12, 1991
INVENTOR(S) : Rudolf Schaulin

It is certified that error appears in the above-identified patent and that said Letters Patent is hereby corrected as shown below:

-- On the Title page, Item [75] the address of the inventor should read:

Riehen, Switzerland and item [30] the foreign application priority date should read:

5/11/88--.

Signed and Sealed this

Twenty-ninth Day of June, 1993

Attest:

MICHAEL K. KIRK

*Attesting Officer*      *Acting Commissioner of Patents and Trademarks*